US009086519B2

United States Patent
Arakawa et al.

(10) Patent No.: US 9,086,519 B2
(45) Date of Patent: Jul. 21, 2015

(54) MULTI-CORE FIBER, AND MULTI-CORE FIBER CONNECTION METHOD USING THE SAME

(71) Applicant: FUJIKURA LTD., Tokyo (JP)

(72) Inventors: Yoko Arakawa, Sakura (JP); Katsuhiro Takenaga, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/016,706

(22) Filed: Sep. 3, 2013

(65) Prior Publication Data

US 2014/0003779 A1    Jan. 2, 2014

Related U.S. Application Data

(63) Continuation of application No. PCT/JP2012/054517, filed on Feb. 24, 2012.

(30) Foreign Application Priority Data

Mar. 4, 2011  (JP) ................................. 2011-048393

(51) Int. Cl.
*G02B 6/036*  (2006.01)
*G02B 6/02*   (2006.01)
*G02B 6/46*   (2006.01)
*G02B 6/255*  (2006.01)

(52) U.S. Cl.
CPC ............. *G02B 6/02042* (2013.01); *G02B 6/46* (2013.01); *G02B 6/02395* (2013.01); *G02B 6/0365* (2013.01); *G02B 6/255* (2013.01); *Y10T 29/49826* (2015.01)

(58) Field of Classification Search
CPC .................................................. G02B 6/02042
See application file for complete search history.

(56) References Cited

U.S. PATENT DOCUMENTS

| | | | | |
|---|---|---|---|---|
| 6,097,868 | A * | 8/2000 | Tardy et al. .................... | 385/126 |
| 2008/0107386 | A1 | 5/2008 | Kudou et al. | |
| 2009/0324242 | A1* | 12/2009 | Imamura ....................... | 398/142 |
| 2010/0296784 | A1 | 11/2010 | Imamura | |
| 2012/0087626 | A1* | 4/2012 | Nagashima et al. .......... | 385/124 |

FOREIGN PATENT DOCUMENTS

| | | |
|---|---|---|
| JP | 11-095049 A | 4/1999 |
| JP | 2008-116745 A | 5/2008 |
| JP | 2012-032524 A | 2/2012 |
| WO | 2010/073821 A1 | 7/2010 |
| WO | 2011/102191 A1 | 8/2011 |

OTHER PUBLICATIONS

Hayashi, Tetsuya, et al., "Crosstalk Variation of Multi-Core Fibre due to Fibre Bend", ECOC, Italy, 2010.
Hayashi, Tetsuya et al., "Very Low Crosstalk and Low Loss Multi-Core Fiber", Proceedings of the 2011 IEICE General Conference, Japan, 2011, pp. 312.
International Search Report dated Mar. 19, 2012, issued in corresponding application No. PCT/JP2012/054517.

* cited by examiner

*Primary Examiner* — Omar R Rojas
(74) *Attorney, Agent, or Firm* — Westerman, Hattori, Daniels & Adrian, LLP

(57) ABSTRACT

A multi-core fiber includes a plurality of cores, a marker which is disposed to be parallel to the cores, and a clad which surrounds outer peripheral surfaces of the cores and the marker. The marker may propagate light having a wavelength which is the same as a wavelength of light which propagates in the core as single mode light.

20 Claims, 5 Drawing Sheets

MULTI-CORE FIBER, AND MULTI-CORE FIBER CONNECTION METHOD USING THE SAME

CROSS-REFERENCE TO RELATED APPLICATION

This application is based on and claims priority of PCT International Application No. PCT/JP2012/054517, filed on Feb. 24, 2012, the entire contents of which are incorporated herein by reference.

TECHNICAL FIELD

The present invention relates to a multi-core fiber, and more particularly, to a multi-core fiber which allows easy connection and is capable of suppressing crosstalk despite finer diameters.

BACKGROUND ART

Currently, optical fibers used for optical fiber communication systems which are generally spreading adopt a structure in which an outer periphery of one core is surrounded by a clad, and information is transmitted when an optical signal propagates in this core. Further, as the optical fiber communication systems spread, the amount of information to be transmitted is dramatically increasing in recent years. Following an increase in the amount of information to be transmitted, the optical fiber communication systems use several tens or several hundreds of multiple optical fibers to perform long-distance optical communication of a large volume.

It is known that, to reduce the number of optical fibers in such an optical fiber communication system, a plurality of signals is transmitted by means of light propagating in respective cores using a multi-core fiber in which outer peripheries of a plurality of cores is surrounded by one clad.

In the optical fiber communication systems, when long-distance optical communication is performed, a plurality of optical fibers may be connected. Further, when the multi-core fiber is used, a plurality of multi-core fibers may be connected. When the plurality of multi-core fibers is connected, it is preferable for specific cores of the multi-core fiber are connected to each other.

However, in the multi-core fiber, by the demand for homogeneity of an optical property of the cores, the cores are arranged so as to be symmetric with respect to a central axis of the fiber in some cases. However, when the cores are arranged in symmetric with respect to the central axis of the fiber, if the multi-core fibers are connected to each other, it is difficult to identify specific cores and thus it is difficult to connect specific cores.

In Patent Document 1, it is disclosed that in order to easily connect multi-core fibers, the multi-core fiber has a marker which is formed of a quartz glass having a high refractive index or a quartz glass having a low refractive index in a clad to be parallel to the core.
[Patent Document 1] WO 2010/073821 A

SUMMARY OF THE INVENTION

Objects to be Achieved by the Invention

As disclosed in Patent Document 1, when the multi-core fibers are connected to each other, in order to easily recognize a position of the marker, the marker is preferably shiny in a connected end surface of the multi-core fiber. For this reason, a refractive index of the marker is set to be higher than a refractive index of the clad, and light is entered the marker from an end portion which is opposite to an end portion to be connected. By doing this, the incident light propagates in the marker and the marker may be shiny at the end surface of a side to be connected.

However, when the light propagates in the core, if a distance between the core and the marker is short, crosstalk of the core and the marker may easily occur. In the meantime, even in the multi-core fiber, there is a demand for finer diameters. Therefore, increase in the distance between the core and the marker runs counter to the demand for the finer diameters.

Therefore, the present invention provides a multi-core fiber which allows easy connection and is capable of suppressing crosstalk despite finer diameters and a multi-core fiber connection method using the same.

Means for Achieving the Objects

A multi-core fiber of the present invention includes a plurality of cores; a marker which is disposed to be parallel to the cores; and a clad which surrounds outer peripheral surfaces of the cores and the marker. The marker may propagate light having a wavelength which is the same as a wavelength of light which propagates in the core as single mode light.

According to such a multi-core fiber, the light enters from one end portion onto a marker to make the other end portion shiny. Therefore, a position of the marker is easily recognized. Accordingly, when a plurality of multi-core fibers is connected to each other, the markers are easily adjusted so that the multi-core fibers are easily connected to each other by positioning the cores with each other. Further, the marker propagates light having a wavelength which is same as a wavelength of light which propagates in the core as single mode light. In other words, the marker may be considered as a single mode core with respect to a usage wavelength of the multi-core fiber. The marker which is considered as a single mode core has a small mode field diameter (MFD) of light which propagates and thus the crosstalk is small. As a result, even when the marker approaches the core, the crosstalk of the core and the marker may be suppressed. Therefore, according to the multi-core fiber of the present invention, the crosstalk of the cores may be suppressed by the marker despite finer diameters.

The multi-core fiber may further include a plurality of first clads which surround the outer peripheral surfaces of the cores and a plurality of second clads which surround outer peripheral surfaces of the first clads. The clads surround the outer peripheral surfaces of the cores through the first clads and the second clads and when a refractive index of the core is $n_1$, a refractive index of the first clad is $n_2$, a refractive index of the second clad is $n_3$, and a refractive index of the clad is $n_4$, the following relations may be satisfied.

$$n_1 > n_2 > n_3$$

$$n_1 > n_4$$

$$n_3 < n_4$$

In such a multi-core fiber, the first clad is surrounded by the second clad having a refractive index $n_3$ which is smaller than a refractive index $n_2$ of the first clad and a trench structure may be formed by the cores, the first clads, and the second clads. Accordingly, the light which propagates in the core may be strongly trapped by the core. As a result, the light which propagates in the core is suppressed from being leaked outside the core element and thus the crosstalk may be further reduced.

In the multi-core fiber, the plurality of cores may be arranged in a position which is symmetric with respect to a central axis of the clad.

According to such a multi-core fiber, the optical property may be homogenized by the arrangement of the cores.

In the multi-core fiber, distances between at least two cores which are adjacent to the marker and the marker may be different from each other.

According to such a multi-core fiber, the positions of the markers at both end surfaces are different from each other so that it is possible to prevent an end portion to be connected in both end portions of the multi-core fiber from being erroneously connected.

Further, in a cross-section of a fiber of the multi-core fiber, a shape of the marker may be asymmetric with respect to a line which passes through a center of the clad.

According to such a multi-core fiber, the shapes of the markers at both end surfaces are different from each other so that it is possible to prevent an end portion to be connected in both end portions of the multi-core fiber from being erroneously connected.

Further, in the multi-core fiber, a refractive index of the marker may be higher than a refractive index of the core.

According to such a multi-core fiber, a force which traps the light of the marker is stronger than a force which traps the light of the core so that the crosstalk between the marker and the core may be further reduced and the crosstalk between the cores may be suppressed by the marker.

Further, in the multi-core fiber, a plurality of markers may be provided.

According to such a multi-core fiber, the positions are more exactly adjusted so that the multi-core fibers may be connected to each other.

Further, in the multi-core fiber, the plurality of markers may be arranged such that a center of the clad and the plurality of markers are not disposed on a straight in a cross-section of the fiber.

According to such a multi-core fiber, relative positional relations of the markers at both end surfaces are different from each other so that it is possible to prevent an end portion to be connected in both end portions of the multi-core fiber from being erroneously connected.

A multi-core fiber connection method of the present invention includes a preparation step which prepares two multi-core fibers according to any one of the aforementioned multi-core fibers, which has a marker formed on the same position, an opposing step which opposes end surfaces to be connected in the multi-core fibers such that center axes of the multi-core fibers match with each other, an entering step which allows light to enter the marker of one of the multi-core fibers, and a core adjustment step which rotates at least one of the multi-core fibers around the axis while observing an intensity of light emitted from the marker of the other multi-core fiber to perform the core adjustment.

According to knowledge of the inventors, when the multi-core fibers having a marker are connected to each other, in the related art, a vicinity of the end surface of the multi-core fiber to be connected is recognized by an image from a lateral direction and the positions of the markers of the multi-core fibers are adjusted to each other to adjust the core. However, the multi-core fiber has a large number of cores, so that it is difficult to recognize the marker from the lateral direction. Further, even though the markers are recognized by the image to be fitted to each other, it is difficult to exactly adjust the core. In contrast, according to the multi-core fiber connection method using the multi-core fiber of the present invention, when the core is adjusted so as to maximize an intensity of light emitted from the marker, the connection loss of the light which propagates in the marker may be minimized. In this case, in each of the multi-core fibers, the positional relations of the marker and the core match with each other so that the connection loss of the light which propagates in the marker is minimized. Accordingly, the connection loss of the light which propagates in the core may be also minimized. Therefore, it is possible to easily and exactly perform core adjustment.

Effect of the Invention

As described above, according to the present invention, a multi-core fiber which allows easy connection and is capable of suppressing crosstalk despite finer diameters is provided.

EMBODIMENT OF THE INVENTION

Figure 1A:
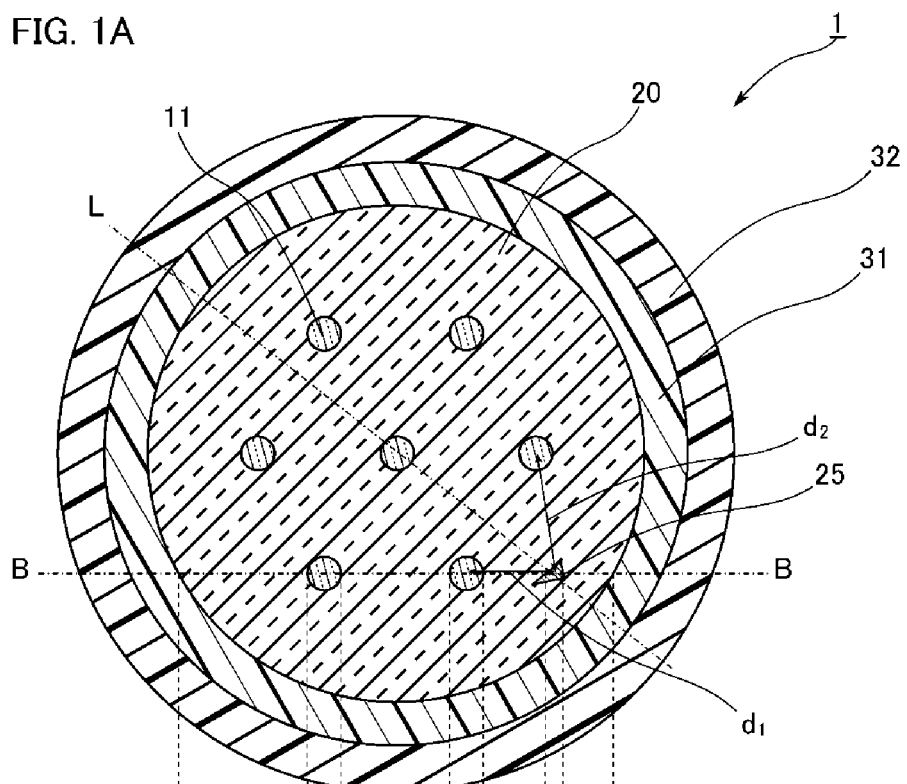
FIGS. 1A and 1B are views illustrating a state of a multi-core fiber according to an embodiment of the present invention.

A preferred embodiment of a multi-core fiber according to the present invention will be described in detail below referring to the drawings.

First Embodiment

Figure 1B:
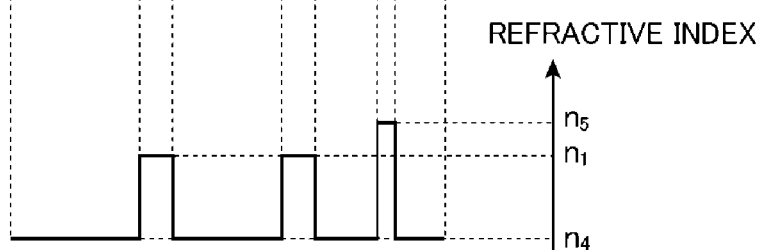

FIGS. 1A and 1B are a view illustrating a state of a multi-core fiber according to an embodiment of the present invention. Specifically, FIG. 1A is a view illustrating a state of a structure in a cross-section which is perpendicular to a length direction of a multi-core fiber of the embodiment and FIG. 1B is a view illustrating a distribution of a refractive index taken along line B-B of FIG. 1A.

As illustrated in FIG. 1A, a multi-core fiber 1 according to an embodiment includes a plurality of cores 11, markers 25 which are provided so as to be parallel to the cores 11, a clad 20 which surrounds all of the plurality of cores 11, is buried between the cores 11, surrounds an outer peripheral surface of each core 11 and surrounds an outer peripheral surface of the marker 25, an inner protective layer 31 which covers the outer peripheral surface of the clad 20, and an outer protective layer 32 which covers an outer peripheral surface of the inner protective layer 31.

In the embodiment, the number of cores 11 is seven in which one core is disposed at a center of the cores and six cores 11 are arranged at an outer periphery side at a constant interval. Thus, the center core 11 and the respective outer periphery side cores 11 are arranged in a triangular grid. Hence, inter-center distances between the cores 11 are equal. The plurality of cores 11 which are arranged as described above are symmetric with respect to an axis of the clad 20. That is, when the multi-core fiber 1 is rotated at a predetermined angle around the center axis of the clad 20, the positions of the respective outer periphery side cores 11 after rotation are the positions of the other outer periphery side cores 11 before rotation. Further, the core 11 which is disposed at the center does not move even when the multi-core fiber 1 is rotated around an axis. The cores 11 are arranged in a position which is symmetric with respect to an axis of the clad 20 and thus it is possible to homogenize an optical property by the arrangement of the cores 11.

Further, with the embodiment, a diameter $D_1$ of the respective adjacent cores 11 are slightly different from each other. Although sizes of respective components which form the multi-core fiber 1 are not specifically limited, a diameter $D_1$ of the center core 11 is 7.8 μm and a diameter $D_1$ of the outer periphery side cores 11 is different from the diameter $D_1$ of the center core 11 by 1.0%. Further, diameters $D_1$ of the respective adjacent cores 11 are different from each other by 1.0 to 2.0%. As described above, even though the diameters $D_1$ of the respective adjacent cores 11 are physically and slightly different from each other, the diameters $D_1$ of the respective cores 11 are almost unchanged but have approximately same optical property, as seen from light which propagates in the cores 11. Further, the diameter $D_4$ of the clad 20 is, for example, 130 μm, the outer diameter of the inner protective layer 31 is, for example, 200 μm and the outer diameter of the outer protective layer 32 is, for example, 250 μm. Furthermore, the inter-center distances between the respective cores 11 are not limited in particular, and are, for example, 35 μm.

As illustrated in FIG. 1A, the marker 25 has a shape which is asymmetric with respect to a line L which passes through a center of the clad 20 and in the embodiment, a shape of a cross-section is a substantially triangular shape. Further, when light propagates in the marker 25 as a core, a diameter of the core with respect to the light is smaller than the diameter $D_1$ of the core 11 and a diameter of the core of the marker 25 with respect to the light which propagates in the marker 25 is 4.04 μm.

Further, as illustrated in FIG. 1A, the marker 25 is disposed at a further outer periphery side than the outer periphery side core 11. Therefore, the marker 25 is arranged such that distances $d_1$ and $d_2$ between the cores 11 which are adjacent to the marker 25 and the marker 25 are different from each other. For example, a distance $d_1$ between the core 11 having a smaller distance from the marker 25 and the marker 25 is 31 μm and a distance $d_2$ between the core 11 having a larger distance from the marker 25 and the marker 25 is 36 μm.

Further, as illustrated in FIG. 1B, a refractive index $n_1$ of the respective cores 11 is higher than a refractive index $n_4$ of the clad 20 and a refractive index $n_5$ of the marker 25 is further higher than the refractive index $n_1$ of the core 11.

Further, in FIG. 1B, the refractive indices of the inner protective layer 31 and the outer protective layer 32 will not be presented.

Furthermore, with the embodiment, lights propagate in the respective cores 11 in a single mode.

A wave-guiding property of the light which propagates in the core of the optical fiber is defined as a relative refractive index difference Δ with respect to the refractive index of the clad based on the refractive index of the core. Here, when i=1 and 5, a relative refractive index difference $\Delta_1$ of the core 11 having a refractive index $n_i$ and a relative refractive index difference $\Delta_5$ of the marker 25 are defined by the following Formula 1.

$$\Delta_i = \frac{n_i^2 - n_4^2}{2n_i^2} \qquad \text{Formula 1}$$

The relative refractive index difference $\Delta_1$ of the core 11 is defined in accordance with a mode field diameter MFD which may be provided as a property. Therefore, as described above, when the diameter $D_1$ of the core 11 is approximately 7.8 μm, if a wavelength of light which propagates in the core 11 is 1260 nm, the relative refractive index difference $\Delta_1$ becomes 0.33% or less in order to allow the core 11 to propagate the light in a single mode. Similarly, when a wavelength of the light which propagates in the core 11 is 1500 nm, the relative refractive index difference $\Delta_1$ becomes 0.48% or less in order to allow the core 11 to propagate the light in a single mode.

Further, the marker 25 propagates light having the same wavelength as the light which is propagated by the core 11 in the single mode. Accordingly, as described above, when light having a wavelength of 1260 nm propagates in the core 11, the marker 25 propagates the light having the same wavelength in the single mode. In other words, when the multi-core fiber 1 is used, the light having a wavelength which propagates in the core 11 propagates in the single mode. Accordingly, if the multi-core fiber 1 is an optical fiber which performs the communication in the single mode, the marker 25 propagates the light having the same wavelength as the light which is propagated by the core 11 in the single mode, in the single mode. Here, when it is assumed that a cut-off wavelength is λc and a cross-sectional area of the marker 25 is S, a condition that allows the light to propagate in the marker 25 in the single mode is given by the following Formula 2.

$$\frac{S \times \Delta_5}{\lambda c^2} \approx 0.11 \qquad \text{Formula 2}$$

Accordingly, for example, when a wavelength of the light which is propagated by the core 11 is 1260 nm, $\Delta_5$=1.2% or less. Further, a core diameter of the marker 25 is 4.04 μm as described above and a cross-sectional area is 12.8 μm², a cut-off wavelength λc is 1190 nm or shorter so that light having the same wavelength as the light which is propagated by the core may be propagated in the single mode. Similarly, when the wavelength of the light which is propagated by the core 11 is 1500 nm, $\Delta_5$=1.75% or less. Further, when the cross-sectional area of the marker 25 is 12.8 μm², the cut-off wavelength λc is 1440 nm or less. Therefore, it is possible to propagate the light having the same wavelength as the light which is propagated by the core in the single mode.

Further, by designing the multi-core fiber as described above, a crosstalk value between the respective cores 11 of the multi-core fiber 1 of the embodiment may be suppressed to −20 dB or less in a transmission distance of 1 km.

As described above, according to the multi-core fiber 1 of the embodiment, the refractive index of the marker 25 is higher than the refractive index of the clad 20 so that the light enters the marker 25 from one end surface to make the marker 25 shiny at the other end surface and thus a position of the marker 25 is easily recognized at the other end surface. Accordingly, when a plurality of multi-core fibers 1 is connected to each other, the markers 25 are easily adjusted with each other so that the positions of the cores 11 of the multi-core fiber 1 are adjusted with each other to easily connect the multi-core fibers 1 to each other.

Further, the marker 25 propagates the light having the same wavelength of the light which propagates in the core 11 as single mode light. In other words, the marker 25 may be considered as a single mode core at a usage wavelength of the multi-core fiber. The marker 25 which is considered as the single mode core has a smaller mode field diameter MFD of propagating light than that of a multimode core so that the crosstalk is small. Therefore, even when the marker 25 and the core 11 approach each other, the crosstalk of the core 11 and the marker 25 may be suppressed. As a result, according to the multi-core fiber 1 of the embodiment, even when a diameter of the fiber is reduced, the crosstalk between the cores 11 through the marker 25 may be suppressed.

Further, according to the multi-core fiber 1 of the embodiment, the refractive index $n_5$ of the marker 25 is higher than the refractive index $n_1$ of the core 11 and a force which traps the light of the marker 25 is stronger than a force which traps the light of the core 11 so that the crosstalk between the marker 25 and the core 11 may be further reduced and the crosstalk between the cores 11 through the marker 25 may be suppressed.

Further, according to the multi-core fiber 1 of the embodiment, the markers 25 are arranged such that distances $d_1$ and $d_2$ between the core 11 which is adjacent to the marker 25 and the marker 25 are different from each other. Therefore, the positions of the markers on both end surfaces of the multi-core fiber 1 are different from each other. Accordingly, it is possible to prevent end portions to be connected from being erroneously connected.

Furthermore, according to the multi-core fiber 1 of the embodiment, the marker 25 has a shape so as to be asymmetric with respect to a line L which passes through a center of the clad 20 so that the shapes of the markers 25 are different at both end surfaces of the multi-core fiber 1. Therefore, it is possible to prevent end portions to be connected from being erroneously connected.

Second Embodiment

Next, a second embodiment of the present invention will be described in detail with reference to FIGS. 2A and 2B. Same or similar components as the first embodiment are denoted by the same reference numerals and a repeated description will not be provided if not specifically described.

Figure 2A:
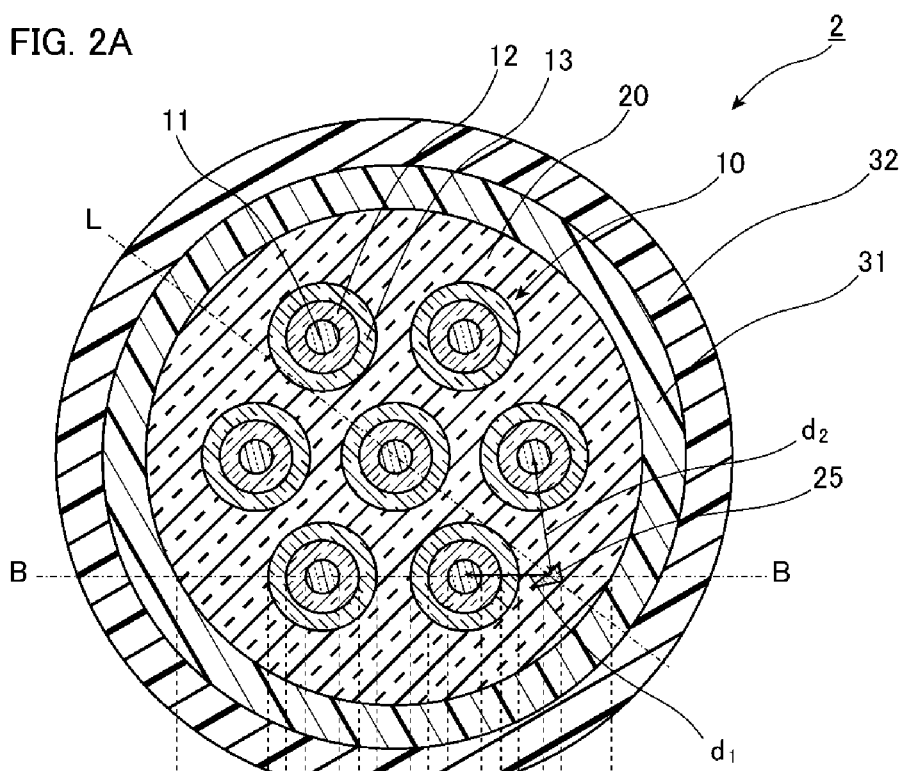
FIGS. 2A and 2B are views illustrating a state of a multi-core fiber according to an embodiment of the present invention.
Figure 2B:
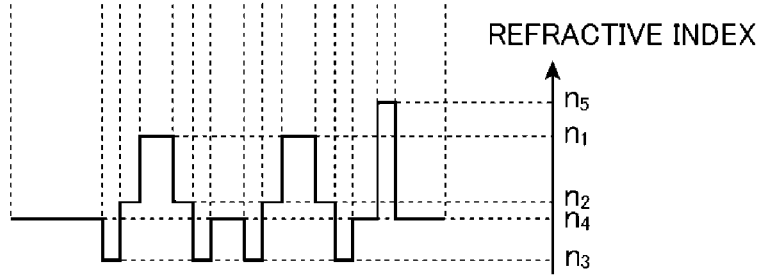

FIGS. 2A and 2B are plan views illustrating a multi-core fiber according to a second embodiment of the present invention. Specifically, FIG. 2A is a view illustrating a status of a structure in a cross-section which is perpendicular to a length direction of the multi-core fiber of the second embodiment and FIG. 2B is a view illustrating a distribution of a refractive index taken along line B-B of FIG. 2A.

As illustrated in FIG. 2A, a multi-core fiber 2 of the second embodiment includes a plurality of core elements 10 and cores 11 are provided in the core elements 10, which is different from the multi-core fiber 1 of the first embodiment.

Each of the core elements 10 includes a core 11, a first clad 12 which surrounds an outer peripheral surface of the core 11, and a second clad 13 which surrounds an outer peripheral surface of the first clad 12. Also in the second embodiment, similarly to the first embodiment, diameters $D_1$ of the adjacent cores 11 in each of the core elements 10 are optically substantially same but physically and slightly different from each other. A diameter $D_1$ of a center core 11 is 7.9 μm and a diameter $D_1$ of the outer periphery side core 11 is different from the diameter $D_1$ of the center core 11 by 1.0%. Further, the diameters $D_1$ of the adjacent outer periphery side cores 11 are different from each other by 1.0 to 2.0%, for example. As described above, even though the diameters $D_1$ of the respective adjacent cores 11 are physically and slightly different from each other, the diameters $D_1$ of the respective cores 11 are almost unchanged but have approximately same optical property, as seen from light which propagates in the cores 11. Outer diameters $D_2$ of the first clads 12 are equal to each other and for example, 17.3 μm. Further, Outer diameters $D_3$ of the second clads 13 are equal to each other and for example, 25.1 μm. Accordingly, thicknesses of the first clads 12 are slightly different from each other but thicknesses of the second clads 13 are equal to each other. Further, the diameter $D_4$ of the clad 20 is, for example, 136 μm, the outer diameter of the inner protective layer 31 is, for example, 215 μm and the outer diameter of the outer protective layer 32 is, for example, 250 μm. Furthermore, the inter-center distances between the respective cores 11 are not limited in particular, and are, for example, 39 μm.

Further, as illustrated in FIG. 1B, a refractive index $n_2$ of the first clad 12 is lower than a refractive index $n_1$ of the core 11 and a refractive index $n_3$ of the second clad 13 is further lower than the refractive index $n_2$ of the first clad 12. Further, a refractive index $n_4$ of the clad 20 is a refractive index between the refractive index $n_2$ of the first clad 12 and the refractive index $n_2$ of the second clad 13. In other words, each of the refractive indices $n_1$ to $n_4$ satisfies the following relations:

$$n_1 > n_2 > n_3$$

$$n_1 > n_4$$

$$n_3 < n_4$$

As described above, each of the core elements 10 has a trench structure.

Further, in FIG. 1B, the refractive indices of the inner protective layer 31 and the outer protective layer 32 will not be presented.

As illustrated in FIG. 2A, the marker 25 has a shape which is asymmetric with respect to a line L which passes through a center of the clad 20 and in the present embodiment, a shape of a cross-section is substantially a triangular shape and an area thereof is 6.98 μm².

Further, as illustrated in FIG. 2A, the marker 25 is disposed at a further outer periphery side than the outer periphery side core 11. Therefore, the marker 25 is arranged such that distances $d_1$ and $d_2$ between the cores 11 which are adjacent to the marker 25 and the marker 25 are different from each other. For example, a distance $d_1$ between the core 11 having a smaller distance from the marker 25 and the marker 25 is 22 μm and a distance $d_2$ between the core 11 having a larger distance from the marker 25 and the marker 25 is 36 μm.

As described above, a wave-guiding property of an optical fiber is defined as a relative refractive index difference A between the refractive index and the refractive index of the clad 20. Here, when i=1 to 5, a relative refractive index difference $\Delta_i$ of a portion having a refractive index $n_i$ is defined by the above-mentioned Formula 1. For example, when the diameter $D_1$ of the core 11 as described above is approximately 7.9 μm, if a wavelength of light which propagates in the core 11 is 1260 nm, the relative refractive index difference $\Delta_1$ becomes 0.33% or less in order to allow the core 11 to propagate the light in a single mode. Similarly, when a wavelength of the light which propagates in the core 11 is 1500 nm, the relative refractive index difference $\Delta_1$ becomes 0.48% or less in order to allow the core 11 to propagate the light in a single mode.

Further, a condition that allows the light to propagate in the marker 25 in the single mode is given by the above-mentioned Formula 2. Accordingly, for example, when a wavelength of the light which is propagated by the core 11 is 1260 nm, if a cross-sectional area of the marker 25 is 6.98 µm², $\Delta_5$=1.35% or less and a cut-off wavelength $\lambda c$ is 1190 nm or shorter so that light having the same wavelength as the light which is propagated by the core may be propagated in the single mode. Similarly, when the wavelength of the light which is propagated by the core 11 is 1500 nm, if the cross-sectional area of the marker 25 is 6.98 µm² as described above, $\Delta_5$=1.93% or less and the cut-off wavelength $\lambda c$ is 1440 nm or shorter. Therefore, it is possible to propagate the light having the same wavelength as the light which is propagated by the core in the single mode.

Further, by designing the multi-core fiber as described above, a crosstalk value between the respective cores 11 of the multi-core fiber 2 of the embodiment may be suppressed to −20 dB or less in a transmission distance of 1 km.

Therefore, the refractive index $n_3$ of the second clad 13 is smaller than the refractive index $n_2$ of the first clad 12 and the refractive index $n_4$ of the clad 20 so that an effect which traps the light into the core 11 is increased and thus it is possible to prevent the light which propagates in the core 11 from being leaked from the core element 10. Therefore, the second clad 13 and the clad 20 having a low refractive index serve as a barrier and crosstalk between adjacent cores 11 is prevented.

The relative refractive index difference $\Delta_1$ of the core 11 is defined in accordance with a mode field diameter MFD which may be provided as a property. Although in many cases, the relative refractive index difference $\Delta_2$ of the first clad 12 to the clad 20 is approximately 0, it can be appropriately set to be a positive or negative value for adjusting wavelength dispersion characteristics.

If all of the refractive indices $n_1$ to $n_4$ satisfy the above Formula, the refractive indices are not specifically limited. FIG. 1B illustrates a status where the refractive index $n_2$ of the first clad 12 is set to be between the refractive index $n_1$ of the core 11 and refractive index $n_4$ of the clad 20. Further, even though not illustrated, the refractive index $n_2$ of the first clad 12 may be set to be between the refractive index $n_4$ of the clad 20 and the refractive index $n_3$ of the second clad 13 or the refractive index $n_2$ of the first clad 12 may be set to be equal to the refractive index $n_4$ of the clad 20.

Further, in the present embodiment, the refractive indices $n_1$ of the cores 11 in the core elements 10 are equal to each other, the refractive indices $n_2$ of the first clads 12 in the core elements 10 are equal to each other, and the refractive indices $n_3$ of the second clads 13 in the core elements 10 are equal to each other.

Similarly to the first embodiment, the multi-core fiber 2 according to the present embodiment is, as illustrated in FIGS. 2A and 2B, a multi-core fiber having seven core elements 10. The cores 11 are arranged so as to be similar to the cores 11 in the first embodiment. Therefore, intervals of outer peripheral surfaces of the second clads 13 in the adjacent core elements 10 are equal to each other.

When it is assumed that a distance between centers of the adjacent cores 11 is $\Lambda$, if a distance $\Lambda$ is 30 µm or longer, it is preferable to reduce the crosstalk. Further, if the distance is 50 µm or shorter, it is preferable to reduce a diameter of the clad 20. When it is assumed that a distance between the outer peripheral surfaces of the adjacent second clads 13 is w, if the distance w is longer than the usage wavelength, it is preferable to reduce the crosstalk between the adjacent cores 11. Further, if the distance is three times or more of the usage wavelength, the crosstalk may further reduced. As a result, if the distance w is 5 µm or longer, the distance is three times or more of a wavelength of 1500 nm range which is generally used as a long communication wavelength, so that the crosstalk in the general communication may be sufficiently reduced.

Therefore, when the distance $\Lambda$ and the distance w satisfy the following relation:

$$0.18 \leq w/\Lambda \leq 0.47$$

it is preferable to reduce the crosstalk.

In order to satisfy the above relation, a thickness of the first clad 12 or a thickness of the second clad 13 may be adjusted. In the present embodiment described above, in the core elements 10, the diameters $D_1$ of the cores 11 are optically substantially equal to each other and the outer diameters $D_2$ of the first clads 12 are equal to each other, and the outer diameters $D_3$ of the second clads 13 are equal to each other. However, for example, the thickness of the first clad 12 or the thickness of the second clad 13 may be adjusted as described below. That is, the thickness of the first clad 12 of the core element 10 which is disposed at the center of the clad 20 may be smaller than the thicknesses of the first clads 12 of the core elements 10 which are arranged at the outer periphery side of the clad 20. Similarly, the thickness of the second clad 13 of the core element 10 which is disposed at the center of the clad 20 may be smaller than the thicknesses of the second clads 13 of the core elements which are arranged at the outer periphery side of the clad 20. By doing this, in the core element 10 which is disposed at the center of the clad 20, by the first clad 12 and the second clad 13, an effect which traps the light into the core 11 is weaker than that of the core elements 10 which are arranged at the outer periphery side of the clad 20. However, a surrounding of the core element 10 which is disposed at the center of the clad 20 is surrounded by the second clads 13 of the core elements 10 which are arranged at the outer periphery side of the clad 20 so that a higher mode is hardly relieved from the core 11 of the core element 10 which is arranged at the center of the clad 20. Therefore, the cut-off wavelength $\lambda c$ in the core element 10 which is disposed at the center of the clad 20 tends to be longer than the cut-off wavelength $\lambda c$ of the core elements 10 which are arranged at the outer periphery side of the clad 20 and the higher mode may be easily operated at a low wavelength. As described above, the thickness of the first clad 12 or the second clad 13 of the core element 10 which is disposed at the center of the clad 20 is smaller than the thicknesses of the first clads 12 or the second clads 13 of the core elements which are arranged at the outer periphery side of the clad 20 so that the higher mode may be easily relieved in the core element 10 which is disposed at the center of the clad 20. In the core element 10 which is disposed at the center of the clad 20 and the core elements which are arranged at the outer periphery side of the clad 20, the cut-off wavelengths $\lambda c$ may be balanced. The balance is, particularly, in the first embodiment, useful when the distance w between the outer peripheral surfaces of the adjacent second clads 13 becomes small. Further, not the core element 10 which is arranged at the center of the clad 20, but if the core element 10 has a surrounding which is surrounded by the core element 10, the thickness of the first clad 12 or the second clad 13 is preferably smaller than the thickness of the first clad 12 or the second clad 13 of the core element which is arranged at the outer periphery side of the clad 20. For example, twelve core elements are arranged at a outer periphery side further than the outer periphery side core element of the present embodiment and the number of the core elements 10 is 19, in addition to the core element which is disposed at the center of the clad, a plurality of core elements whose surroundings are surrounded by the core element are provided so that the core is also useful for such a core element arranged.

As described above, according to the multi-core fiber 2 of the present embodiment, the first clad is surrounded by the second clad having a refractive index $n_3$ which is smaller than the refractive index $n_2$ of the first clad, the trench structure is formed by the cores, the first clad, and the second clad. Accordingly, the light which propagates in the core may be strongly trapped by the core. As a result, it is possible to suppress the light which propagates in the core from being leaked outside the core element. In other words, the crosstalk between the core 11 and the marker 25 may be suppressed more than the multi-core fiber of the first embodiment and the crosstalk between cores through the marker 25 may be reduced.

Third Embodiment

Figure 3:
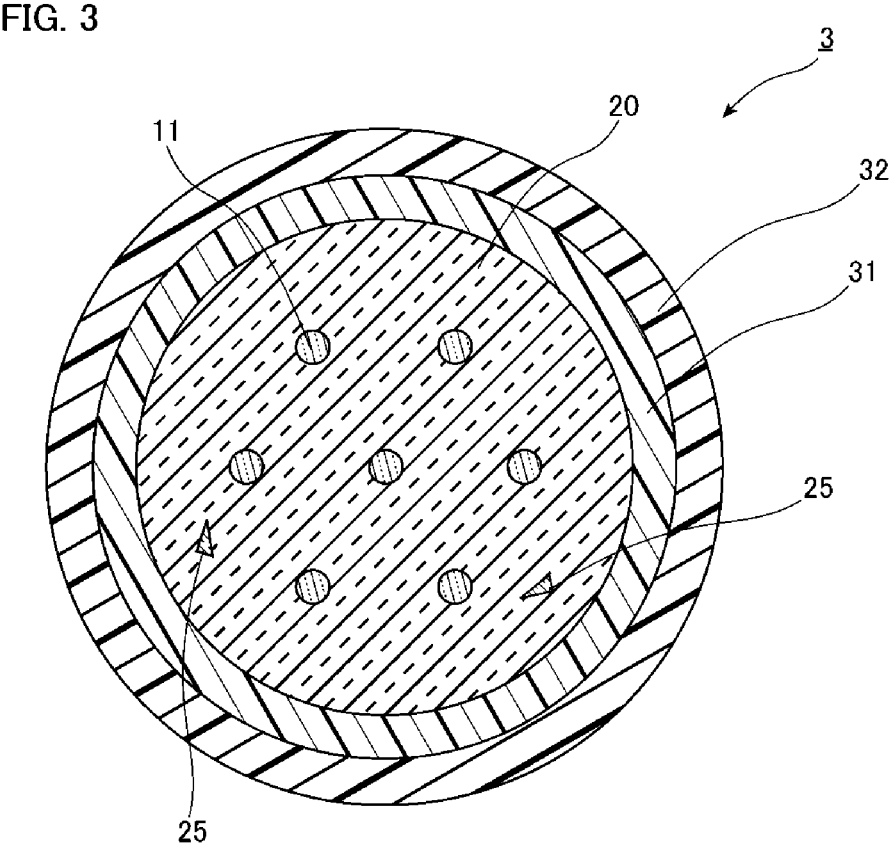
FIG. 3 is a view illustrating a state of a structure in a cross-section which is perpendicular to a length direction of a multi-core fiber according to a third embodiment of the present invention.

Next, a third embodiment of the present invention will be described in detail with reference to FIG. 3. Same or similar components as the first embodiment are denoted by the same reference numerals and a repeated description will not be provided if not specifically described. FIG. 3 is a view illustrating a status of a structure in a cross-section which is perpendicular to a length direction of the multi-core fiber according to the third embodiment of the invention.

As illustrated in FIG. 3, a multi-core fiber 3 according to the present embodiment includes a plurality of markers 25, which is different from the multi-core fiber 1 of the first embodiment.

A center of the clad 20 in a cross-section which is perpendicular to a longitudinal direction of the multi-core fiber and markers 25 are disposed not to be on the straight line. Specific configurations of the markers 25 are same as the configuration of the marker 25 of the first embodiment.

According to the multi-core fiber 3 of the present embodiment, the markers 25 are provided in a plurality of locations so that the multi-core fibers 3 are accurately positioned to be connected to each other.

Although the present invention has been described above by reference to a certain embodiment as an example, the present invention is not limited thereto.

For example, in the embodiment, the marker 25 has a shape which is asymmetric with respect to a line L which passes through a center of the clad 20, but the invention is not limited thereto. Therefore, the marker 25 may have a shape which is symmetric with respect to a line L which passes through a center of the clad 20. In this case, the marker 25 has, for example, a circular shape.

Further, in the above embodiment, the markers 25 are arranged such that distances $d_1$ and $d_2$ between the cores 11 which are adjacent to the markers 25 and the markers 25 are different from each other. However, distances between the cores 11 which are adjacent to the markers 25 and the markers 25 may be equal to each other.

Further, in the above embodiment, a refractive index $n_5$ of the marker 25 is higher than a refractive index $n_1$ of the core 11. However, the invention is not limited thereto, but the refractive index $n_5$ of the marker 25 may be lower than the refractive index $n_1$ of the core 11 as long as the light having the same wavelength of light which propagates in the core 11 propagates in a single mode.

Further, in the embodiment, the number of the cores 11 is seven but the present invention is not limited thereto. If there are a plurality of the cores 11, the number of cores may be seven or smaller or seven or larger. For example, the number of core elements may be three. Alternatively, twelve cores 11 are arranged at a further outer periphery side of the core 11 which is arranged at the outer periphery side of the clad 20 in FIGS. 1A and 1B as described above and thus nineteen cores may be arranged in a triangular grid. Further, the cores 11 may be arranged in a grid which is aligned in 5 rows by 5 columns or arranged in other arrangements.

Further, in the embodiment, the diameters $D_1$ or the refractive indices $n_1$ of the cores 11 in adjacent cores 11 may be set to be different from each other or set to be equal to each other. When the diameters $D_1$ or the refractive indices $n_1$ of adjacent cores 11 are set to be different from each other, the crosstalk of the cores 11 may be further reduced.

Similarly, in the second embodiment, the outer diameter $D_2$ or the refractive index $n_2$ of the first clad 12 and the outer diameter $D_3$ or the refractive index $n_3$ of the second clad 13 in the adjacent core elements 10 are equal to each other, but any of the outer diameter $D_2$ or the refractive index $n_2$ of the first clad 12 and the outer diameter $D_3$ or the refractive index $n_3$ of the second clad 13 in the adjacent core elements 10 may be different from each other. Even in this case, the crosstalk may be further reduced.

Figure 4:
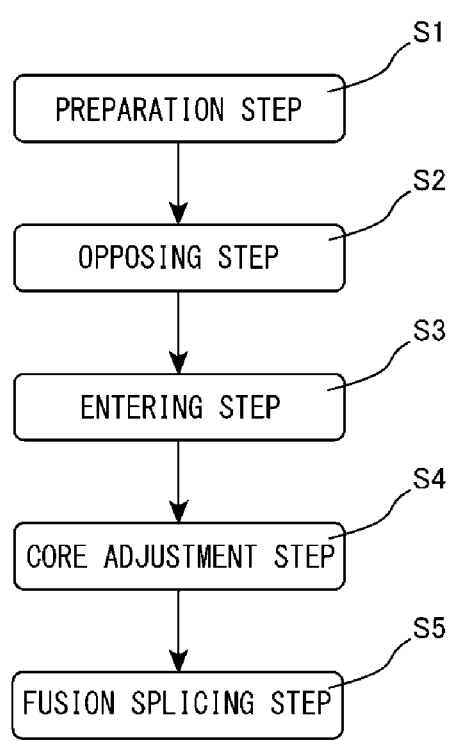
FIG. 4 is a flowchart illustrating a procedure of a connection method which connects multi-core fibers to each other.
Figure 5:
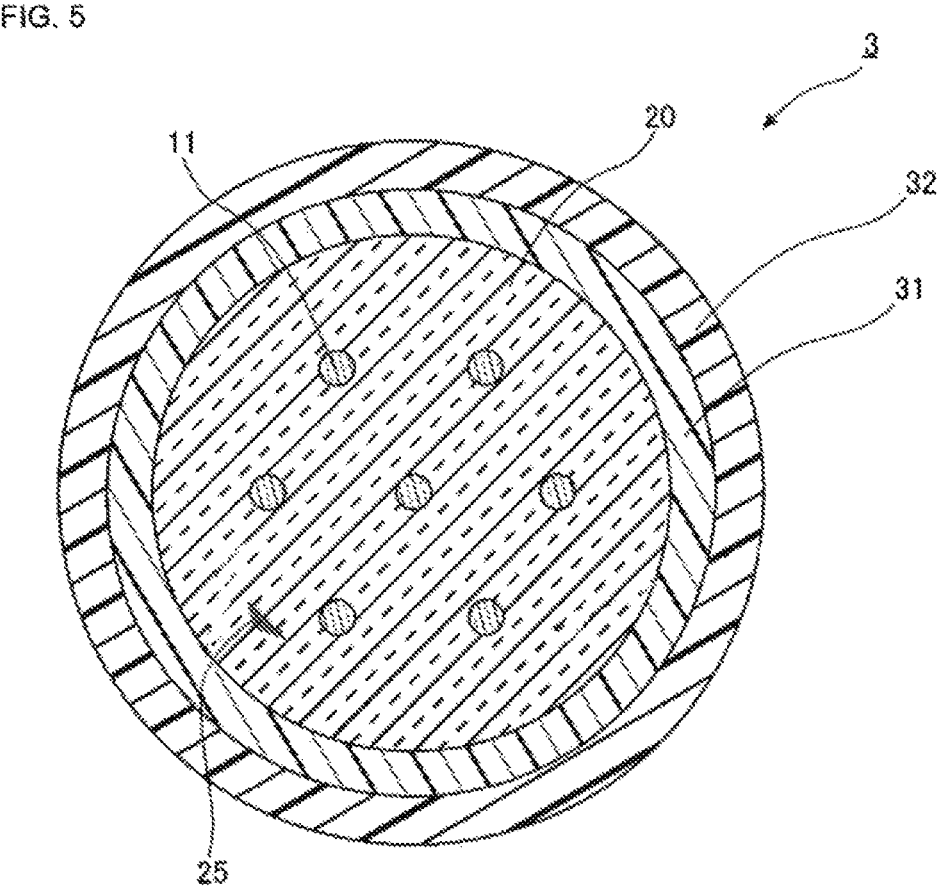
FIG. 5 is a view illustrating an endface opposite to FIG. 1A.

Here, a connection method for connecting the multi-core fibers to each other will be described. FIG. 4 is a flowchart illustrating a procedure of a connection method for connecting multi-core fibers to each other. As illustrated in FIG. 4, the connection method for connecting the multi-core fibers to each other includes a preparation step S1 in which two multi-core fibers are prepared, an opposing step S2 in which end surfaces of the multi-core fibers are opposed, an entering step S3 in which light enters the marker, an core adjustment step S4 in which the core is adjusted while observing an intensity of the light emitted from the marker, and a fusion splicing step S5 in which the end surfaces to be connected are fused.

Preparation Step S1

Two multi-core fibers which are prepared in the preparation step S1 are considered as multi-core fibers having markers which are formed in the same position. That is, relative positional relation between the marker 25 and the core 11 is same as in the respective multi-core fibers. Therefore, the position of the marker 25 is accurately adjusted by the end surfaces to be connected so that the cores 11 of the multi-core fibers are accurately positioned. However, as described above, if the relative positional relation between the marker 25 and the core 11 is same in the respective multi-core fibers, the diameters of the clads 20 of the respective multi-core fibers may be different from each other and covering degrees of the clads 20 of the respective multi-core fibers by the inner protective layer 31 or the outer protective layer 32 may be different from each other.

Opposing Step S2

Next, the end surfaces to be connected in the multi-core fibers are opposed such that central axes of the multi-core fibers match with each other. That is, an end surface from which light of one of the multi-core fibers is emitted and an end surface which the light of the other multi-core fiber enters are opposed such that the central axes of the multi-core fibers in the vicinity of the end surfaces match with each other. In this case, even though a gap between the end surfaces of the multi-core fibers may be or may be not formed. However, as described below, the end surface needs to be opposed so as to allow the light to propagate in the marker 25 of the multi-core fibers.

Entering Step S3

Next, light enters the marker 25 of one of the multi-core fibers. The light is preferably light having a wavelength which propagates in the marker 25 in the signal mode. As described above, the marker 25 of the multi-core fiber of the above embodiment propagates light having the same wavelength as a wavelength of light which propagates in the core 11, as single mode light. Accordingly, the light having the same wavelength as the wavelength of the light which propagates in the core 11 may enter the marker 25. The light enters the marker 25 as follows. That is, first, on the end surface which is opposite to a side to be connected of the multi-core fiber, the optical fiber may be connected such that the light may enter the marker 25. The optical fiber is preferably a single mode fiber which propagates the light which enters the marker 25 in a single mode. Therefore, the light can enter the marker 25 by the light entering the optical fiber from a light source.

Core Adjustment Step S4

Next, at least one of the multi-core fibers are rotated around an axis while observing an intensity of the light emitted from the marker 25 of the other multi-core fiber to adjust the core. An intensity of the light emitted from the marker 25 of the other multi-core fiber may be observed as follows. First, an optical fiber is connected at an end surface which is opposite to a side to be connected of the other multi-core fiber so as to allow the light emitted from the marker 25 to enter thereto. The optical fiber may be the same optical fiber as the optical fiber which is used to allow the light to enter the marker 25 of one multi-core fiber. Therefore, the intensity of the light which is emitted from the connected optical fiber is observed using a power meter. By doing this, the intensity of the light which is emitted from the marker 25 of the other multi-core fiber can be observed. Therefore, at least one of the multi-core fibers is rotated around the axis and the core adjustment is performed such that the intensity of the light emitted from the marker 25 of the other multi-core fiber becomes strongest to position the markers 25 of the multi-core fibers. By doing this, the cores 11 of the multi-core fibers may be positioned.

Fusion Splicing Step S5

Next, the end surfaces of the multi-core fibers whose cores are adjusted are fused. The fusion splicing may use fusion splicing by an oxyhydrogen burner or fusion splicing by arc welding.

As described above, according to the multi-core fiber connection method using a multi-core fiber of the embodiment, if the core adjustment is performed such that the intensity of the light emitted from the marker 25 becomes the strongest, the connecting loss of the light which propagates in the marker 25 may be minimized. In this case, the markers 25 of the multi-core fibers are formed in the same position so that the connection loss of the light which propagates in the core may be minimized. Therefore, it is possible to easily and exactly perform core adjustment. Specifically, if the light which enters the marker 25 is light which propagates in the marker 25 in the single mode, when the light emitted from the marker 25 is detected, a peak which more accurately corresponds to a mode field diameter of the light which propagates in the marker 25 may be obtained. Accordingly, the core adjustment may be more precisely performed. However, even when the light which enters the marker 25 propagates in the marker 25 in a multiple mode, it is needless to say that the core adjustment may be performed by a core adjustment method of the present invention.

INDUSTRIAL APPLICABILITY

As described above, according to the present invention, a multi-core fiber which allows easy connection and is capable of suppressing crosstalk despite finer diameters is provided.

DESCRIPTION OF REFERENCE NUMERALS 1, 2, 3 ... multi-core fiber
10 ... core element
11 ... core
12 ... first clad
13 ... second clad
20 ... clad
25 ... marker
31 ... inner protective layer
32 ... outer protective layer
S1 ... preparation step
S2 ... opposing step
S3 ... entering step
S4 ... core adjustment step
S5 ... fusion splicing step

The invention claimed is:
1. A multi-core fiber comprising:
a plurality of cores;
a marker which is disposed to be parallel to the cores; and
a surrounding clad which surrounds outer peripheral surfaces of the cores and the marker;
wherein the marker propagates light having a wavelength which is the same as a wavelength of light which propagates in the cores as single mode light,
wherein the plurality of cores is arranged in a position which is symmetric with respect to a central axis of the surrounding clad, and
wherein, in a cross-section of a fiber, a shape of the marker is asymmetric with respect to a line which passes through a center of the surrounding clad.
2. The multi-core fiber according to claim 1, further comprising:
a plurality of first clads which surround the outer peripheral surfaces of the cores; and
a plurality of second clads which surround outer peripheral surfaces of the first clads,
wherein the surrounding clad surrounds the outer peripheral surfaces of the cores through the first clads and the second clads, and
when a refractive index of the cores is $n_1$, a refractive index of the first clads is $n_2$, a refractive index of the second clads is $n_3$, and a refractive index of the surrounding clad is $n_4$, the following relations are satisfied

$n_1 > n_2 > n_3$ $n_1 > n_4$ $n_3 < n_4$.

3. The multi-core fiber according to claim 1,
wherein distances between at least two cores which are adjacent to the marker and the marker are different from each other.
4. The multi-core fiber according to claim 1,
wherein a refractive index of the marker is higher than the refractive index of the cores.

5. The multi-core fiber according to claim 1, wherein a plurality of markers is provided.

6. The multi-core fiber according to claim 5, wherein the plurality of markers is arranged such that a center of the surrounding clad and the plurality of markers are not disposed on a straight in a cross-section of the fiber.

7. A multi-core fiber connection method, comprising:
a preparation step which prepares first and second multi-core fibers, each having a marker formed on the same position;
an opposing step which opposes end surfaces to be connected in the multi-core fibers such that center axes of the multi-core fibers match with each other;
an entering step which allows light to enter the marker of one multi-core fiber; and
a core adjustment step which rotates at least one of the multi-core fibers around the axis while observing an intensity of light emitted from the marker of the other multi-core fiber to perform the core adjustment,
wherein each of the first and second multi-core fibers comprising:
a plurality of cores;
the marker which is disposed to be parallel to the cores; and
a surrounding clad which surrounds outer peripheral surfaces of the cores and the marker;
wherein the marker propagates light having a wavelength which is the same as a wavelength of light which propagates in the cores as single mode light.

8. A multi-core fiber connection method according to claim 7, wherein each of the first and second multi-core fibers further comprises:
a plurality of first clads which surround the outer peripheral surfaces of the cores; and
a plurality of second clads which surround outer peripheral surfaces of the first clads,
wherein the surrounding clad surrounds the outer peripheral surfaces of the cores through the first clads and the second clads, and
when a refractive index of the cores is $n_1$, a refractive index of the first clads is $n_2$, a refractive index of the second clads is $n_3$, and a refractive index of the surrounding clad is $n_4$, the following relations are satisfied $n_1 > n_2 > n_3$ $n_1 > n_4$ $n_3 < n_4$.

9. A multi-core fiber connection method according to claim 7, wherein the plurality of cores is arranged in a position which is symmetric with respect to a central axis of the surrounding clad.

10. A multi-core fiber connection method according to claim 9, wherein distances between at least two cores which are adjacent to the marker and the marker are different from each other.

11. A multi-core fiber connection method according to claim 9, wherein, in a cross-section of a fiber, a shape of the marker is asymmetric with respect to a line which passes through a center of the surrounding clad.

12. A multi-core fiber connection method according to claim 7, wherein a refractive index of the marker is higher than the refractive index of the cores.

13. A multi-core fiber connection method according to claim 7, wherein a plurality of markers is provided.

14. A multi-core fiber connection method according to claim 13, wherein the plurality of markers is arranged such that a center of the surrounding clad and the plurality of markers are not disposed on a straight in a cross-section of the fiber.

15. A multi-core fiber comprising:
a plurality of cores;
a marker which is disposed to be parallel to the cores; and
a surrounding clad which surrounds outer peripheral surfaces of the cores and the marker;
wherein the marker propagates light having a wavelength which is the same as a wavelength of light which propagates in the cores as single mode light,
wherein the plurality of cores is arranged in a position which is symmetric with respect to a central axis of the surrounding clad, and
wherein distances between at least two cores which are adjacent to the marker and the marker are different from each other such that a position of the marker relative to the two adjacent cores in one end face of the multi-core fiber is different from a position of the marker relative to the two adjacent cores in the other end face of the multi-core fiber located opposite to the one end face and such that an image of the one end face of the multi-core fiber and an image of the other end face of the multi-core fiber are rotationally asymmetrical with each other.

16. The multi-core fiber according to claim 15, further comprising:
a plurality of first clads which surround the outer peripheral surfaces of the cores; and
a plurality of second clads which surround outer peripheral surfaces of the first clads,
wherein the surrounding clad surrounds the outer peripheral surfaces of the cores through the first clads and the second clads, and
when a refractive index of the cores is $n_1$, a refractive index of the first clads is $n_2$, a refractive index of the second clads is $n_3$, and a refractive index of the surrounding clad is $n_4$, the following relations are satisfied $n_1 > n_2 > n_3$ $n_1 > n_4$ $n_3 < n_4$.

17. The multi-core fiber according to claim 15, wherein a refractive index of the marker is higher than the refractive index of the cores.

18. The multi-core fiber according to claim 15, wherein a plurality of markers is provided.

19. The multi-core fiber according to claim 18, wherein the plurality of markers is arranged such that a center of the surrounding clad and the plurality of markers are not disposed on a straight in a cross-section of the fiber.

20. The multi-core fiber according to claim 15, wherein the respective two cores are positioned on respective sides of a center line passing through a center of the surrounding clad and a center of the marker in a cross-section.

* * * * *